Oct. 31, 1950     M. J. ZWOSTA     2,528,203
ANTISKID CHAIN
Filed March 5, 1948
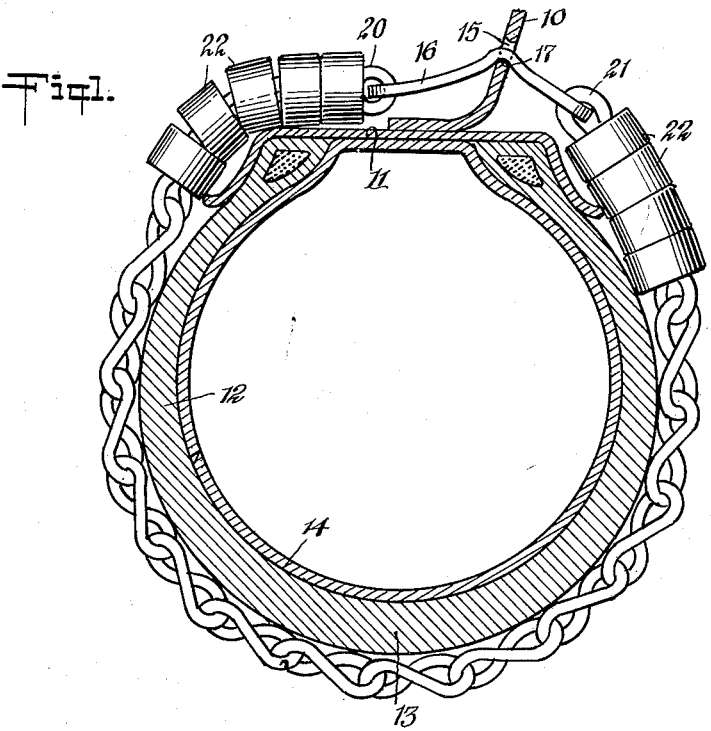
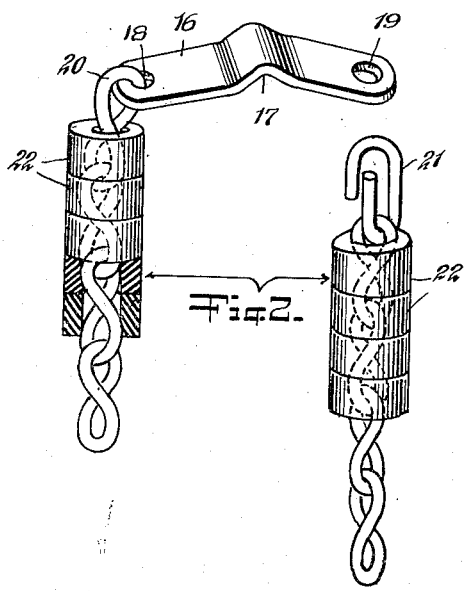
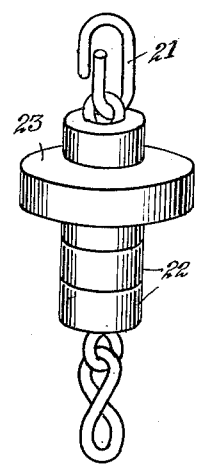
INVENTOR.
Michael J. Zwosta
BY
Munn, Liddy & Glaccum
Attorneys Patented Oct. 31, 1950

2,528,203

UNITED STATES PATENT OFFICE 2,528,203

ANTISKID CHAIN

Michael J. Zwosta, Brooklyn, N. Y.

Application March 5, 1948, Serial No. 13,262

2 Claims. (Cl. 152—233)

This invention relates to new and useful improvements in anti-skid devices for vehicle wheels and has especial reference to anti-skid chains for automobile wheels.

In inclement weather when skid chains are necessary, it is extremely annoying to have to stop and repair, remove, or replace a chain and especially to find that the device has broken and fallen off and become lost just when no replacement was at hand. It is an object of this invention to provide a simple, and efficient anti-skid chain device which cannot become lost even if it breaks.

It is also especially difficult and annoying in such weather to have to get out and take the time, in inconvenient locations and positions of the wheels, to remove and repair and replace chains and anti-skid devices, especially when no lifting jack is available, or when the situation is difficult for one to be applied. It is another object of this invention to provide a simple, efficient, and economical device which can be quickly and easily applied, removed, and repaired "in situ" and with a minimum of effort.

A further object is the provision of a simple, economically manufactured device made of two or three simple, readily available elements, so that a driver with a pair of pliers and a few extra chain links can repair the device in a matter of two or three minutes.

Further and more specific objects, features and advantages will more clearly appear from a consideration of the detailed specification hereinafter set forth, especially when taken in connection with the accompanying drawings which illustrate present preferred forms which the invention may assume and which form part of the specification.

In brief and general terms, the invention comprises a chain to pass transversely across the tread of a tire, the ends of the chain connected to a strap which is adapted to pass through a slot in the wheel disc or between the spokes or openings in the wheel between the hub and the wheel rim. There are several of these chains independently thus connected to the tire. In manufacturing these devices one end of the chain is permanently fixed to one end of the strap, but the other end of the chain has an open link which can be engaged with a larger hole in the other end of the strap after the strap has been positioned as above described and the chain has been passed around the tire.

In a particular form the strap has holes of unequal length at its ends and is preferably bent in the middle somewhat to form a recess to receive the edge of the slot through which the strap passes. Also, preferably the chain is provided with cushioning washers around the ends thereof near the ends of the strap to prevent the strap falling out of the slot and to protect the adjacent surfaces of the tire and the wheel rim from undue wear. For wheels, where the passage through which the strap passes is larger than usual, then there is provided an extra large washer of relatively soft material at each end of the strap to prevent the strap from falling out of the passage when once disposed therein.

The present preferred form which the invention may assume is illustrated in the drawings of which—

Fig. 1 is a vertical cross section through a wheel with the device applied thereto;

Fig. 2 is a partial perspective view of the device apart from the wheel; and

Fig. 3 is a partial perspective view of a modified form of the device.

Referring now merely to the specific forms of the invention illustrated herein, it is seen that it is adapted to be applied to the wheel of a vehicle in which the wheel may be of the disk-wheel type or one which has spokes of wood or metal. The form shown in the drawings is one which is of the disk-type, and there is shown a disc 10 connected in any desired manner to the rim 11 of the wheel on which rim there is disposed a tire 12 having a tread portion 13 and the usual inner tube 14.

In the disc 10 there are formed several passages or slots 15 near the rim 11, and these are provided for the purpose of permitting passage through the disc of short straps 16 which are bent in the middle to provide a sort of recess 17 and have holes 18 and 19 at the ends thereof, the one hole 19 being larger than the other. The strap 16 passes through the slot 15 and the recess 17 rides on the lower edge of the slot as shown in Fig. 1. To the ends of the strap 16 a link chain is connected, the end links 20 and 21 being connected to the strap by means of the holes 18 and 19. The chain passes around the tire and across the tread portion 13 as shown. Preferably, the device is formed to have the end link 21, as manufactured, open as shown in Fig. 2, so that it can be readily connected to the aperture 19 after the strap has been passed through the slot 15 on the wheel. It may then be quickly closed by any suitable tool such as a pair of pliers.

A series of washers 22 preferably of soft material, such as rubber, are disposed on the chain around the links thereof along the portions of the chain immediately adjacent the ends of the strap 16 so as to protect the rim 11 and portions of the sides of the tires from undue wear and rubbing. The rim may be of highly polished metal and the sides of the tires may have the customary white wall of paint thereon and these washers prevent undue wear on these parts.

In those instances where the wheel may have wooden or wire spokes, or where the slots in the discs may be larger than necessary to accommodate the straps 16, I have provided the modification shown in Fig. 3 in which adjacent the ends of the straps there is disposed a much larger washer 23 which, in these instances, will effectively prevent the strap from falling out of the openings in the wheels through which the straps are passed. This washer can readily be slipped into place and will therefore permit the device to be easily and quickly applied to most any type of wheel. The washers 22 and 23 are of such internal diameter that they fit the chain links rather snugly so as to tend not to slide therealong and, being of rubber or similar material, they will tend to stay in position when once disposed in any particular position.

It is apparent that to apply the device in the form shown in Fig. 1, the strap 16 is passed into the slot 15 until the center rides on the lower edge of the slot. The chain is then passed around the tire and the tread thereof and the open link 22 is then engaged with the larger hole 19 in the other end of the strap. This hole is made larger so that the link can be easily connected thereto especially in cramped quarters and where the operator may not have much room in which to manipulate the device. The open link is then closed by means of a pair of pliers. If the wheel is of the type where the slot 15 is larger, or the strap must be passed between wooden or metal spokes where the space between them is larger, then the extra large washer 23 is placed on the chain to prevent the strap from falling out when the chain breaks.

It is also apparent that when this device has been applied and a chain link breaks, the device does not fall off the wheel and become lost, because the strap remains in position, and the flapping or striking of the free ends of the chains against the fenders will warn the driver. Then it is a mere matter of stopping, and connecting the loose ends of the chain with a dog link which all drivers carry in their equipment and this procedure only takes a minute or two. Of course, it is understood that there may be several of these devices disposed around one tire if desired.

Thus I have provided a simple, efficient, economical device which can be readily applied to a tire, which can be quickly and easily adjusted and repaired "in situ." By having several independent devices of this kind on one tire, the breakage of one will not necessitate the adjustment of replacement or removal of the others. It has been found in actual use by truck drivers that this device interrupts the movement of the vehicle to a minimum extent, when it has to be fixed, and therefore, solves a serious problem in connection with cars which have to stop to put on, or repair, or remove skid chains on the road under severe conditions.

While the invention has been described in detail and shown with respect to the accompanying drawing, it is not to be limited to such details, since many changes and modifications may be made in the invention without departing from the spirit and scope thereof. Hence, it is desired to cover any and all forms and modifications of the invention which may come within the language and scope of any one or more of the appended claims.

What I claim as my invention is:

1. An anti-skid device for a vehicle wheel having a disk between the hub and the rim thereof with a slot in said disk which comprises a strap adapted to extend through said slot, said strap having apertures at opposite ends thereof, a flexible anti-skid element extending around a tire on the rim and fixedly engaging with the aperture at one end of the strap, said anti-skid element detachably engaged with the aperture at the other end of the strap, and a plurality of flexible washers disposed around the ends of the chain adjacent the end of the strap to prevent wear and to prevent the strap from falling out of the slot in the disk.

2. An anti-skid device for a vehicle wheel having a disk disposed between the hub and the rim thereof and a slot in the disk which comprises a strap adapted to extend through said slot and having a bend in its middle to rest on the bottom of said slot, said strap apertured at each end, a flexible chain extending around a tire on said rim, one end link of said chain fixedly engaged with the aperture at one end of said strap, a link at the other end of said chain being opened and detachably engaging the aperture at the other end of said slot, and a plurality of flexible washers disposed around the ends of the chain adjacent the end of the strap to prevent wear and to prevent the strap from falling out of the slot in the disk.

MICHAEL J. ZWOSTA.

REFERENCES CITED

The following references are of record in the file of this patent:

UNITED STATES PATENTS

| Number | Name | Date |
| --- | --- | --- |
| 1,112,353 | Bowman | Sept. 29, 1914 |
| 1,330,341 | Phillips | Feb. 10, 1920 |
| 2,491,366 | Farley | Dec. 13, 1949 |